June 6, 1944.   W. WEHR   2,350,852
FOOTWEAR
Filed May 27, 1941
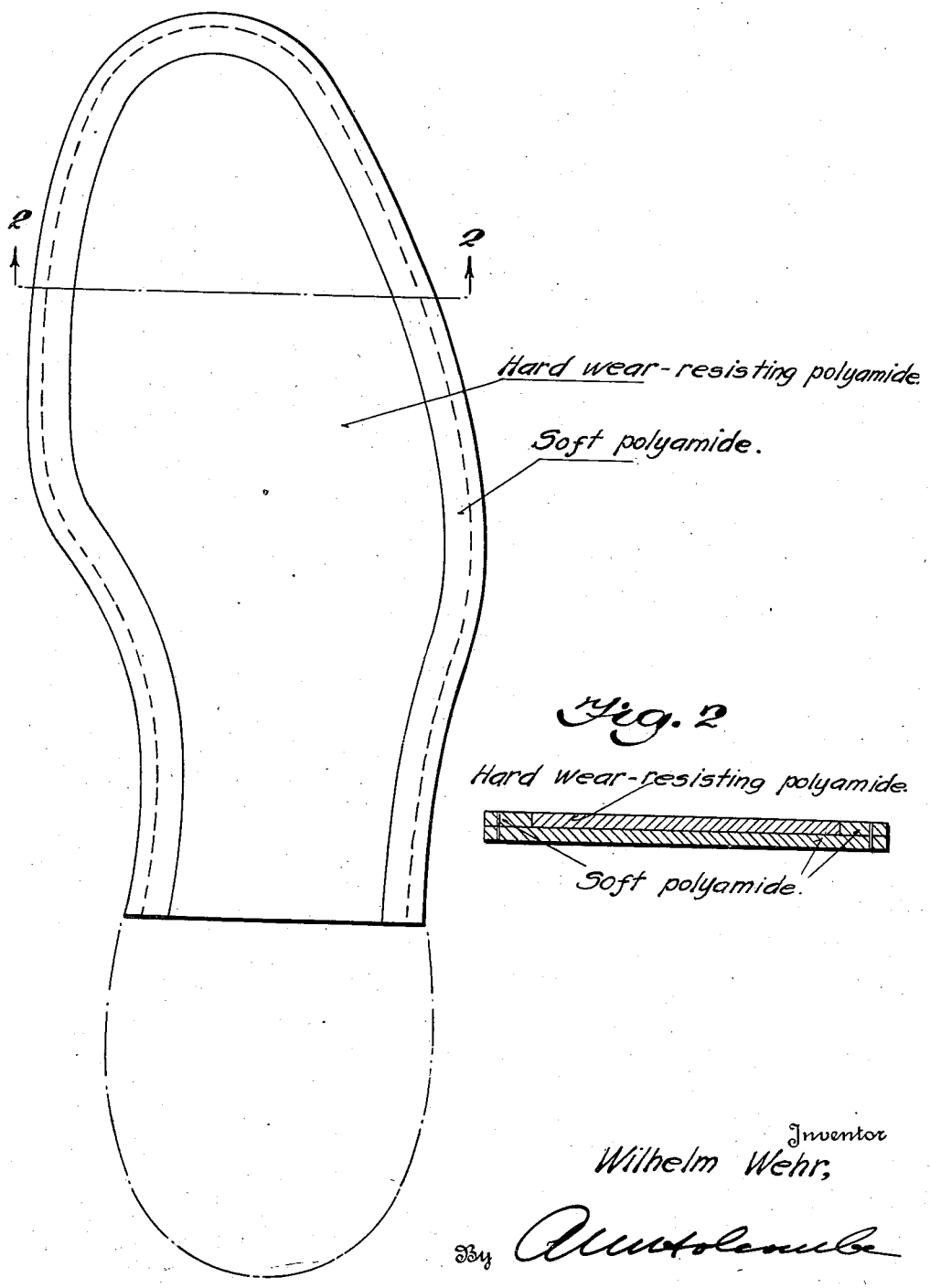
Inventor
Wilhelm Wehr,
By
Attorney.

Patented June 6, 1944

2,350,852

UNITED STATES PATENT OFFICE 2,350,852

FOOTWEAR

Wilhelm Wehr, Eilenburg, Germany; vested in the Alien Property Custodian

Application May 27, 1941, Serial No. 395,495
In Germany July 3, 1940

4 Claims. (Cl. 36—30)

The present invention relates to articles of footwear and more particularly to improvements in the production of such articles from synthetic materials.

It is known in the manufacture of shoes and boots to use leather substitutes produced from vinyl polymers or cellulose derivatives in place of leather, textile materials, and rubber. These leather substitutes, the behavior of which to heat, moisture and the like can be adjusted by incorporating therein filling agents such as cork, sawdust, quartz powder or leather waste, have been employed in the production of outsoles as well as inner or upper portions.

Polyamides, however, cannot be substituted directly for natural leather. Plates or sheets of polyamides, for instance, are too hard even if their surfaces are of a suitable nature. This fact, for instance, prohibits the use of such plates or sheets as tread layers since the resistance to be overcome by bending the foot tires the wearer. Moreover this hardness causes the polyamide soles to separate from their mounting layer in a short period of service.

It is an object of this invention to obviate the above-mentioned drawbacks. Another object is the provision of new articles of footwear which have good wearing properties. Further objects will appear from the following detailed description. The objects of the invention will be understood by reference to the following specification and the accompanied drawing in which latter Fig. 1 is a bottom plan view of a shoe sole embodying the invention and Fig. 2 is a vertical transverse section taken on the line 2—2 in Fig. 1.

These objects are accomplished by using in the manufacture of outsoles of footwear polyamide sheets which consist of at least two materials having different pliability and softness. Plates or sheets of this kind may be prepared in various ways. It is, for instance, possible to unite two or more films of different degrees of softness to form a sheet. Due to the large variety of polyamides available, it is possible to select suitable films and unite them in a plate having properties adapted to their intended use. Thus polyamide sheets which consist of superimposed layers of different pliability and softness are obtained by uniting films of polyamides having different constitutions, which are obtained from different polyamide-forming compositions. Thus a film of polyamide prepared from epsilon caprolactam and a pliable film of a mixed polymerizate derived from equal parts of the condensation product from hexamethylenediamine and dicarboxylic acid (adipic acid) and of epsilon caprolactam may, for instance, be joined together. A similar effect is attained by using a plate consisting of films composed of different proportions of mixed condensates, for example of hexamethylenediammonium adipate and caprolactam in the ratio of 3:2 and 1:1. Moreover, it is possible to unite films which consist of the same chemical substance but which have been stretched and oriented to a different extent. To the foils plasticizers may also be added for varying the pliability. Finally it is helpful sometimes subsequently to stretch the polyamide sheet thus formed from different layers in order still more to shift the difference in pliability. In accordance with the properties of the employed substances this stretching results in raising or in decreasing the flexibility.

It is especially advantageous to influence the pliability of the polyamides by the addition of leather waste. In this case the polyamide essentially serves as the binding agent. Sheets thus made are especially advantageous in that their moisture content rapidly alters with the atmospheric moisture.

Sheets consisting of polyamide and leather waste may, for instance, be produced by mixing finely divided leather, for example the powdered leather waste or the like, with a polyamide dispersion in such proportion that the sheet obtained by drying contains about equal parts of polyamide and leather powder. The quality of the thus resulting sheet may still be improved by combining with it a layer of a still more flexible polyamide. Such sheets are especially suitable for the manufacture of tread layers free from troublesome stiffness.

The new material of the present invention can be worked up in the same way as natural leather. It can, for instance, easily be provided with holes and wooden pins. The sheets may be of various form; it is merely necessary that they are adapted to the intended use. The outsole may, for instance, be so constructed that only the real tread portion thereof consists of a hard polyamide resistant to rubbing, whereas the peripheral portion is formed of a softer polyamide likewise still resistant to rubbing. Such soles also have the advantage that in attaching them to the shoes the stitching is in the softer polyamide portions.

Finally the new material is useful in the production of laces and the ornamentation of the footwear.

I claim:

1. An outsole comprising at least two superimposed layers of polyamides which layers have different pliability and are the reaction products of different polymer-forming compositions, the tread layer being composed of a mixture of polyamide and finely divided leather.

2. In a shoe, a sole stitched thereto composed of a wear resistant polyamide tread portion and a peripheral portion which is composed of softer polyamide having substantial resistance to wear and through which passes the attaching stitching.

3. The outsole set forth in claim 1 in which the less pliable of said two layers is the polymerization product of epsilon-caprolactam and the more pliable tread layer is composed of the interpolymerization product of hexamethylenediamine, adipic acid, and epsilon-caprolactam.

4. The outsole set forth in claim 1 in which one of said two layers is the reaction product of hexamethylenediammonium adipate and caprolactam, and the other of said two layers is the reaction product of the same reactants in different proportions.

WILHELM WEHR.